United States Patent [19]
Welch et al.

[11] Patent Number: 4,720,473
[45] Date of Patent: Jan. 19, 1988

[54] PRODUCTION OF IMPROVED CATALYST-TYPE PARTICLES USING LENGTH AND DENSITY GRADING

[75] Inventors: J. Gary Welch; Robert E. Ellingham, both of Baltimore, Md.

[73] Assignee: CRI International, Inc., Baltimore, Md.

[21] Appl. No.: 894,025

[22] Filed: Aug. 7, 1986

Related U.S. Application Data

[62] Division of Ser. No. 837,690, Mar. 10, 1986.

[51] Int. Cl.⁴ .................. B01J 38/72; C10G 45/08; B03B 4/00; B07B 13/075
[52] U.S. Cl. .................. 502/21; 208/216 R; 209/44.3; 209/467; 209/687; 502/27; 502/38; 502/516
[58] Field of Search .................. 502/21, 516, 27, 517, 502/38; 208/52 CT, 216 R, 216 PP; 209/443, 687, 467, 502, 504, 31, 37, 139 R

[56] References Cited

U.S. PATENT DOCUMENTS

| | | | |
|---|---|---|---|
| 155,735 | 10/1874 | Kurth | 209/443 |
| 912,098 | 2/1909 | Feickert | 209/687 |
| 1,358,375 | 11/1927 | Koch | 209/638 |
| 1,642,331 | 9/1927 | Bunse | 209/687 |
| 1,668,162 | 5/1928 | Loveridge et al. | 209/638 |
| 1,985,772 | 12/1934 | Erickson et al. | 209/631 |
| 2,119,997 | 7/1938 | Moyer | 209/687 |
| 2,421,840 | 6/1947 | Lechthaler et al. | 502/21 |
| 2,423,813 | 7/1947 | Lechthaler et al. | 502/21 |
| 2,434,843 | 1/1948 | Fahnestock et al. | 502/21 |
| 2,436,340 | 2/1948 | Upham et al. | 502/21 |
| 2,437,352 | 3/1948 | Fragen | 502/21 |
| 2,494,556 | 1/1950 | Hornaday | 502/39 |
| 2,567,207 | 9/1951 | Hoge | 209/31 |
| 2,631,981 | 3/1953 | Watson et al. | 502/21 |
| 2,669,353 | 2/1954 | Music | 209/687 |
| 2,688,401 | 9/1954 | Schmitkons et al. | 502/21 |
| 2,704,154 | 3/1955 | Huth | 209/138 |
| 2,759,877 | 8/1956 | Eron | 502/21 |
| 2,780,585 | 2/1957 | Musslewhite, Jr. et al. | 502/21 |
| 2,850,437 | 9/1958 | Kelso | 502/20 |
| 2,947,684 | 8/1960 | Johnson et al. | 502/20 |
| 3,047,149 | 7/1962 | Koning | 502/21 |
| 3,289,833 | 12/1966 | MacGillivray | 209/687 |
| 3,356,213 | 12/1967 | Weber | 209/638 |
| 3,702,238 | 11/1972 | Armistead | 208/216 PP |
| 3,794,602 | 2/1974 | Bivens et al. | 502/21 |
| 3,827,554 | 8/1974 | Richard | 209/443 |
| 4,021,367 | 5/1977 | Gal et al. | 502/21 |
| 4,287,088 | 9/1981 | Sirkar | 502/22 |
| 4,415,088 | 1/1983 | Yano et al. | 209/687 |
| 4,454,240 | 6/1984 | Gangoli | 423/68 |
| 4,486,300 | 12/1984 | Prieb | 209/638 |

OTHER PUBLICATIONS

Carter Day Uni-Flow Cylinder (8 pages).
Triple/s Dynamics-Dry Separations for the Processing Industries (12 pages).
Triple/s Dynamics-V-135D & V-135E Fluidized-Bed Separators (2 pages).
Triple/s Dynamics-Efficient Heavy-End or Simultaneous Light and Heavy-End Separations (4 pages).
The Oliver Model 30 DC Gravity Separator (2 pages).
Oliver Hi-Cap Separators Model 240 (4 pages).
Gravity Separator Operating Instructions Manual—Oliver (16 pages).
CEA-Carter-Day Laboratory Test Models (2 pages).
Carter-Day Uni-Flow Cylinder Separator (4 pages).

*Primary Examiner*—Paul E. Konopka
*Attorney, Agent, or Firm*—Roylance, Abrams, Berdo & Goodman

[57] ABSTRACT

A spent hydrotreating catalyst having carbonaceous and metallic deposits comprising generally cylindrical, free flowing particles of regular geometric shape having substantially the same diameter but of varying length is stripped, length graded, density graded using an upward flow of gas through an inclined, vibrating surface, and regenerated to achieve catalyst activity very near that of a fresh catalyst.

11 Claims, 18 Drawing Figures

FIG. 1
*PRIOR ART*

CYLINDRICAL CATALYST
SEPARATION BY DIAMETER
USING VIBRATING SLOTTED
SCREEN APPARATUS
(NON-SELECTIVE TO
PARTICLE LENGTH)

FIG. 2
*PRIOR ART*

CYLINDRICAL CATALYST SEPARATION
BY LENGTH USING VIBRATING
PUNCH-HOLE PLATE APPARATUS

MOVEMENT ⟶

FIG. 12
REGENERATED CATALYST-UNGRADED
PARTICLE LENGTH DISTRIBUTION FOR LT-1188A

FIG. 13
REGENERATED CATALYST
<1.5 MM FRACTION- 20.4% VOL
PARTICLE LENGTH DISTRIBUTION FOR LT-1188B

FIG. 14
REGENERATED CATALYST
1.5-3.5 MM FRACTION - 73.6% VOL
PARTICLE LENGTH DISTRIBUTION FOR LT-1188C

FIG. 15
REGENERATED CATALYST
>3.5 MM FRACTION - 6.0% VOL
PARTICLE LENGTH DISTRIBUTION FOR LT-1188D

PRODUCTION OF IMPROVED CATALYST-TYPE PARTICLES USING LENGTH AND DENSITY GRADING

This is a division of application Ser. No. 837,690 filed Mar. 10, 1986.

FIELD OF THE INVENTION

This invention relates to the separation and isolation of shaped catalyst-type particles by length and/or by density. More particularly, this invention relates to length and density grading of generally cylindrically-shaped catalyst-type particles, and to the regeneration, rejuvenation, and manufacture of catalyst-type particles which have been subjected to length and/or density grading.

BACKGROUND OF THE INVENTION

Catalysts used in the conversion and refining of hydrocarbons, as well as desorbents or adsorbents in the hydrocarbon separation or purification industry have a desired particle length requirement.

Fresh, or virgin catalysts, desorbents and adsorbents require segmentation into a particular particle length category in order to achieve optimum packing or reduce fixed bed pressure drop, or in the case of fluid beds achieve optimum pumping requirements.

In addition, catalysts used in the conversion and refining of hydrocarbons become contaminated with carbonaceous deposits, known as "coke", as well as metallic deposits, such as nickel, vanadium, iron or silica which may be present in the hydrocarbon feed as organometallic compounds or as tramp impurities. The spent catalyst becomes inactive and must be withdrawn from the catalyst reactor, and passed to a regenerator where coke is burned off to regenerate the catalyst, which is returned for reuse in the reactor. In addition to contamination, continued use of the catalyst results in catalyst attrition, i.e., the generally cylindrical catalyst particles become reduced in length to an undesirable degree. The presence of such shortened catalyst particles in a fixed bed reactor causes plugging of the bed and undesirable pressure buildup resulting in reduced flow and eventual shutdown of the bed. Historically, the catalyst industry has utilized classical screening techniques to remove "dust" or "fines", i.e., very small broken or deformed catalyst particles, from the catalyst mass. However, use of a screen with a square aperture is limited by the diameter of the generally cylindrical catalyst particle or "pill". If the aperture of the screen is larger than the cross-sectional diameter of the pill, the screen cannot separate the catalyst pills on the basis of length. Screening can only be used to separate pills having a length-to-diameter ratio (L/D) less than one from pills having an L/D equal to or greater than one. Thus, a 12 mesh screen (square or slotted) having a 1.7 millimeter opening, which is either square or rectangular, will allow a 1/16 inch (1.6 mm) diameter cylindrically shaped catalyst particle through the opening, whether the catalyst is 2 millimeters or 10 millimeters in length, as long as the catalyst enters the opening on end. Accordingly, in practice, the use of screening techniques is limited to removal of catalyst dust or fines in which the catalyst L/D is less than one.

Unfortunately, catalyst particles having an L/D greater than one can still be too short for usage in the reactor. Most frequently it is the particles with an L/D in the range of 1.0 to 2.0 that are undesirable and cause problems necessitating disposal of the entire catalyst batch containing such particles. Not only is such disposal costly and wasteful, in view of the great expense of catalysts, including those containing noble metals and the like, but, in addition, such disposal results in pollution and toxic waste disposal problems since many such catalysts contain toxic metals, such as cobalt, nickel, and vanadium.

The manufacturing process for shaped catalysts includes sizing and/or breaking procedures to produce a product of a desired particle length distribution. With the state of the art in screening and separation technology, it is frequently difficult if not impossible to obtain the desired particle length distribution, or if it is achieved, this commonly results in the rejection of desired particles along with those undesired because of the poor selectivity of the equipment or process. Major improvements can be obtained if particles can be selectively separated on a length basis if the length division point is such that the L/D ratio is greater than one.

Additionally, spent catalyst particle mixtures are "heterogeneous" in nature since the degree of feedstock-supplied metal contamination on each particle varies within the batch. Thus, a given batch of spent catalyst contains good catalyst particles and contaminated catalyst particles in varying degrees. However, since adequate methods are unavailable to separate the good particles from the more contaminated particles, the entire batch is often discarded.

In other cases a given lot of catalyst may consist of two or more similarly shaped and sized particles but different in composition and individual pellet density. This may commonly be, for example, mixtures of hydrotreating and hydrocracking catalysts or nickel-molybdenum and cobalt-molybdenum catalysts. Such mixtures may be spent catalyst removed from a processing reactor or fresh catalyst which may have been inadvertently mixed during the manufacture or a handling process. These mixtures have diminished value and are commonly discarded.

SUMMARY OF THE INVENTION

In accordance with one aspect of the present invention an admixture consisting essentially of shaped, generally cylindrical, free flowing, similar, catalyst-type particles all having substantially the same diameter, are separated into a first group of particles having both a length to diameter ratio (L/D) greater than one and an L/D less than one and having a length below a predetermined length, $L_1$, in the range of from about 0.8 to about 24 millimeters, and a second group of particles having an L/D greater than one and a length above the predetermined length $L_1$, by passing the catalyst admixture into a cylindrical drum having inwardly opening indentations in a cylindrical wall thereof, the indentations have a transverse diameter approximately equal to $L_1$; rotating the drum about a longitudinal axis thereof at a speed sufficient to entrap particles in the indentations and convey the particles of the first group upwardly to a height permitting the particles to fall into a fixed, upwardly opening trough, while retaining the particles of the second group in a bottom portion of the drum; conveying the particles in the trough out a first outlet; and conveying the particles in the bottom of the drum out a second outlet, separate from the first outlet. As will be hereinafter demonstrated, the length grading process of the present invention is capable of providing a particle size selectivity previously unobtainable with catalyst-type particles.

According to another aspect of the present invention, spent catalyst particles are deoiled, length graded and regenerated to remove carbonaceous deposits.

According to still another aspect of the present invention, spent catalyst particles are regenerated and then length graded.

According to further embodiment of the invention, spent catalyst is deoiled, extracted with acid to remove metal contaminants, regenerated to remove carbon contaminants, and then length graded.

According to another aspect of the present invention similar or dissimilar, fresh, virgin, shaped catalyst, adsorbents, or desorbents, are length graded or separated by density to achieve homogeneous length or density fractions.

According to another embodiment of the present invention, metals contaminated, spent, similar, catalyst-type particles are density graded by a process which comprises feeding a heterogeneous mixture of catalyst particles comprising relatively uncontaminated catalyst particles, lightly contaminated catalyst particles and heavily contaminated catalyst particles, to a highly selective density classification zone in which said relatively uncontaminated particles and said lightly contaminated particles are suspended in a gaseous medium and the heavily contaminated particles contact a vibrating, upwardly sloping surface. In the density classification zone, the heavily contaminated catalyst particles are the most heavily laden with foreign metals and are thus the heaviest particles fed to the density classification zone. These heavily contaminated particles move upwardly along the vibrating surface and pass to an outlet where they are collected. Meanwhile, the lightly contaminated particles, which are the next heaviest, are suspended in a gas just above the heavier particles, move over the heavier particles which being suspended, contact a separate, lower portion of the vibrating deck, and then are withdrawn and collected at a second outlet. The uncontaminated, lightest particles, are suspended and move over the lightly contaminated particles, then contact the lowest portion of the vibrating deck, and are then withdrawn and collected at a third outlet.

Surprisingly, it was discovered that apparatus that had been used for many years for separation of agricultural products, such as the seeds of oats, barley and wheat, could be adapted to the highly selective sparation of spent hydrocarbon conversion catalyst particles having a generally cylindrical shape. As will be hereinafter demonstrated, spent catalyst particles can be length and density graded within a very narrow particle distribution range with a precision unobtainable by conventional screen techniques. Likewise, the density grading method of the present invention provides separation of metals contaminated catalyst material from uncontaminated catalyst particles of similar size and shape to a degree unattainable by known methods.

DESCRIPTION OF THE PREFERRED EMBODIMENTS

Figure 1:
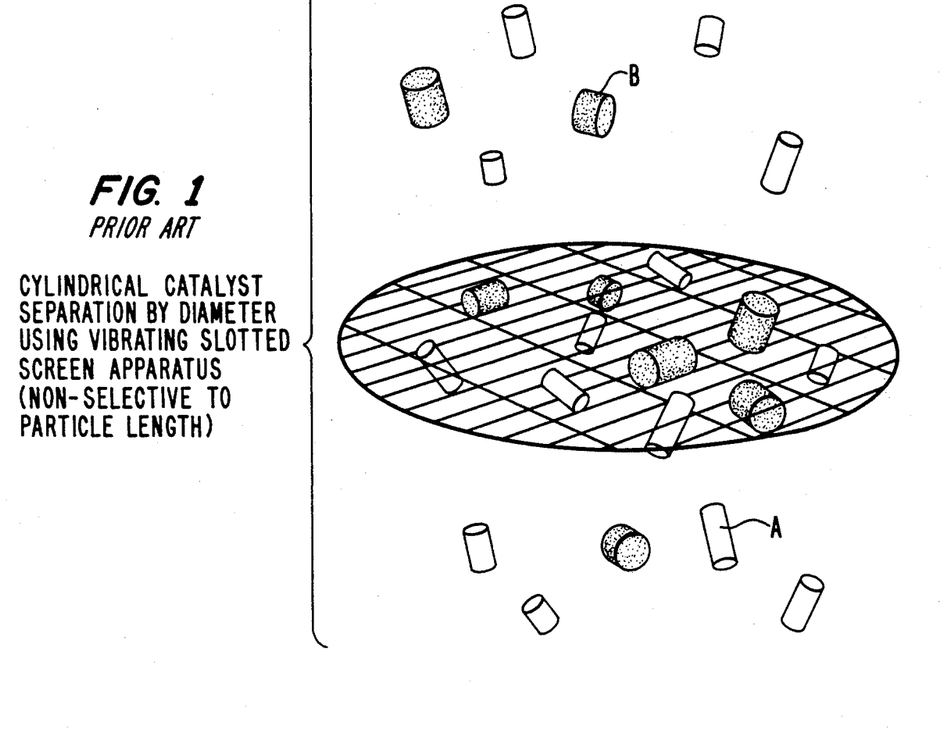
FIGS. 1 and 2 illustrate traditional screening techniques in accordance with the prior art.

The limitations of a prior art slotted or rectangular screen are illustrated in FIG. 1 where the light pellets A have a diameter less than the narrow opening of the slotted screen. The dark pills B have a diameter greater than the narrow opening of the slotted screen. As can be seen from FIG. 1, any pill with a dimension less than the narrow opening can pass through. Thus, in this case, all light pills (with a diameter less than the narrow opening) or all dark pills with a length less than the narrow opening can pass through. FIG. 1 shows that the slotted screen separation is based on a particle's smallest dimension, whereas in length grading in accordance with the present invention, separation is based upon a particle's greatest dimension.

Figure 2:
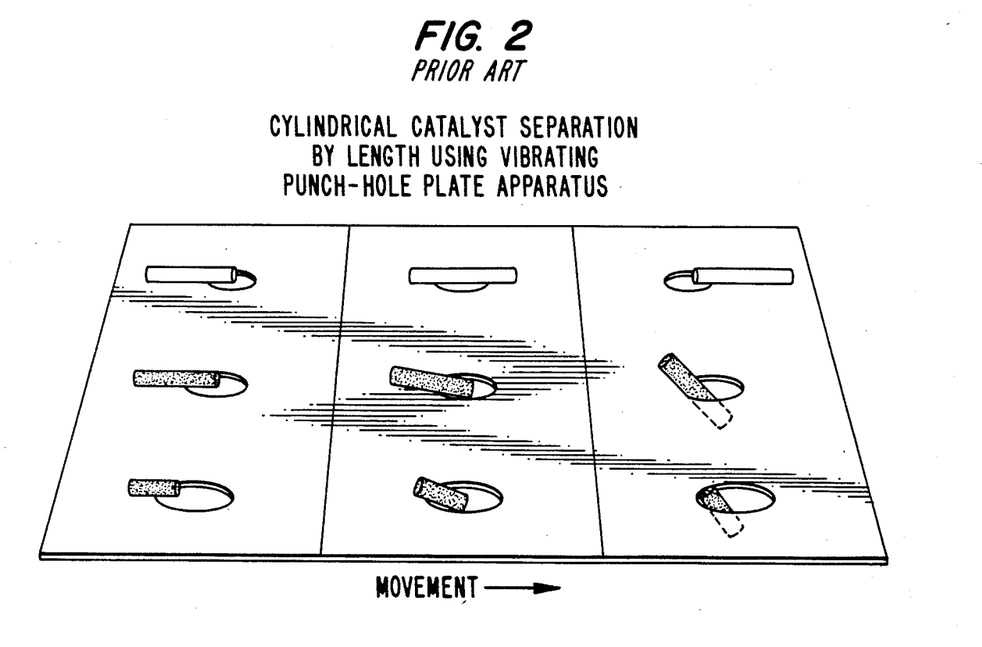

Another screening technique used to separate catalyst pills on a length basis employs vibrating "punched plates" as illustrated in FIG. 2 in accordance with the prior art. In this instance pills are axially aligned in the direction of movement and slide over the holes, and those pills with a length less than two times the hole diameter will "tip" over and pass through. The hole diameter must be greater than the pellet diameter so that this technique can only be used to separate at an L/D ratio greater than two. In practice this technique gives poor selectivity since the vibration of the apparatus required to move the pills across the plate causes many pills to bounce and simply fall through endwise, a problem similar to that experienced with square screens.

Figure 3:
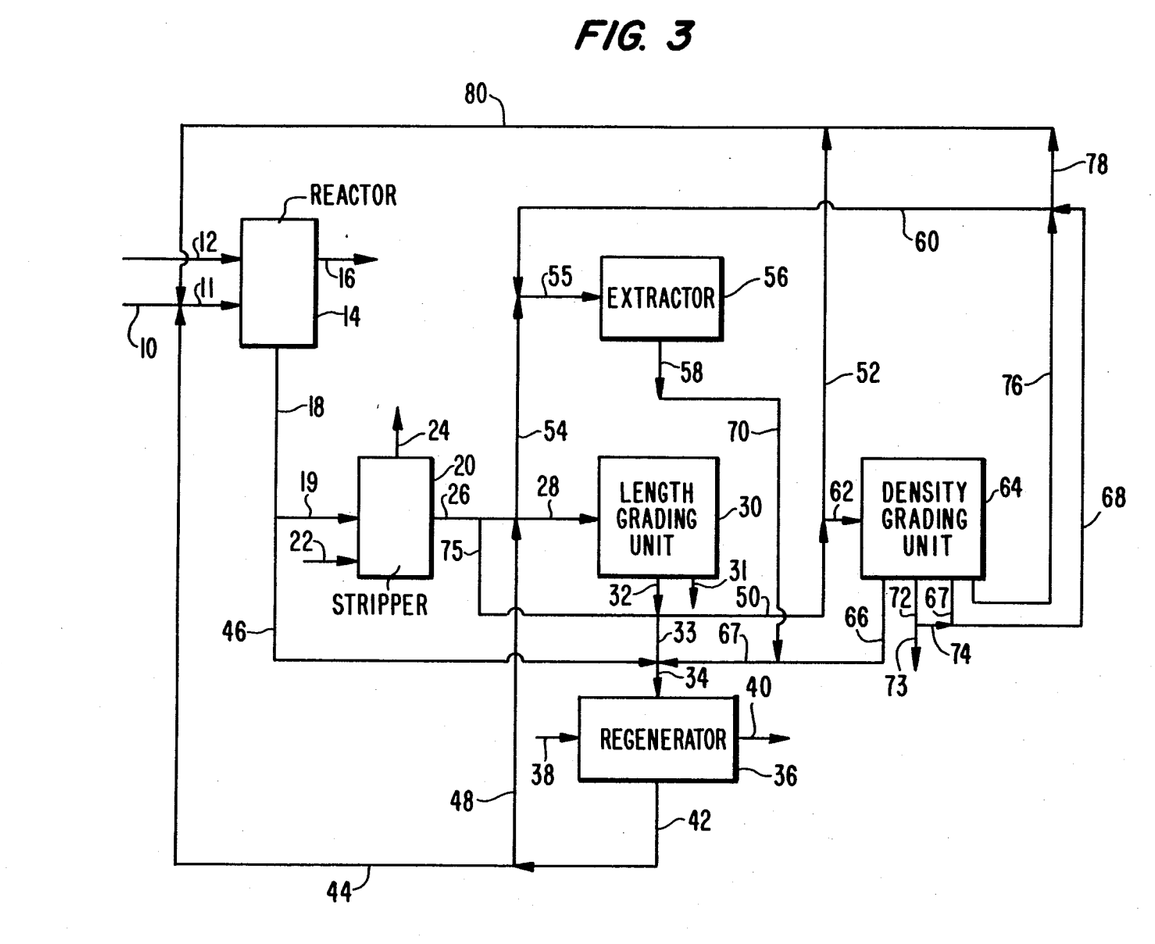
FIG. 3 is a schematic diagram showing the process of the present invention.

Referring now to FIG. 3 of the drawings which is in accordance with the present invention, fresh catalyst particles all having substantially the same diameter are supplied by means of lines 10 and 11 along with a hydrocarbon feedstock in line 12 to reactor 14 shown in block diagram form. The shaped catalyst-type particles of the present invention have a regular geometric shape, and are formed by extrusion or pelletizing. The catalyst particles preferably have a generally cylindrical shape with a generally circular or polylobate cross section. The shaped catalyst-type particles of the present invention are to be distinguished from granular shaped particles which have an irregular shape. The preferred shaped catalyst particles treated by the process of the present invention have a cross-sectional diameter of from about 0.025 to about 1.0 inch (0.635 to about 25.4 mm), preferably from about 0.7 to about 4.0 mm. The diameter referred to in connection with the particles of the present invention is the largest cross-sectional diameter. The expression "substantially the same diameter" as used in the present application means that the diameter of a group of particles to be separated does not vary more than 10 percent.

The process of the present invention is suitable for treatment of any "catalyst-type particle". As used in the present application, the term "catalyst-type particle" means catalysts, catalyst supports, and sorbents. The term "similar" catalyst-type particles means substantially, all of said particles in the mixture have substantially the same chemical composition, e.g., cobalt molybdate on alumina. The term "dissimilar" catalyst-type particle mixture means the mixture contains a significant portion of particles of more than one type, e.g., a mixture comprising cobalt molybdate on alumina particles and alumina per se particles. The catalyst-type particles treated in accordance with the present invention may comprise any of the conventional catalysts used in conversion or refining of hydrocarbons, such as hydrotreating catalysts which commonly contain active metals from the group cobalt, molybdenum, nickel, tungsten and titanium supported on shaped alumina or silica alumina; hydrocracking catalysts which commonly contain active metals such as nickel, molybdenum, tungsten, and palladium supported on shaped silica-alumina or molecular sieves; reforming catalysts which commonly contain platinum, palladium or platinum in combination with another transition or rare earth metal supported on shaped alumina. Catalyst supports or sorbents, for example, silica, alumina, silica-alumina or molecular sieves without promoter metals may also be treated in accordance with this invention. For the purposes of illustration the following description will be directed to nickel-molybdate on a refractory metal oxide supported.

The hydrocarbon feedstock from line 12 is subjected to hydrotreating, for example, in reactor 14 under conventional hydrotreating conditions, and the hydrocarbon products are withdrawn from reactor 14 by means of line 16. Reactor 14 can be a fixed bed, ebullated bed, slurry or fluidized bed type of reactor. Under continued usage the catalyst is subject to attrition, and carbonaceous deposits accumulate on the catalyst. Also, metallic deposits from the hydrocarbon feedstock, such as nickel, vanadium, iron and silica deposit on the catalyst particles. Such attrition and fouling reduces the effectiveness of the catalyst mass and if permitted to continue will result in the shutdown of reactor 14. Thus, spent catalyst particles are withdrawn from reactor 14 by means of lines 18 and 19 to stripper 20 where the spent catalyst particles are deoiled so as to render them free flowing. In stripper 20 the oily spent catalyst particles may be contacted with an inert gas, such as nitrogen, introduced by means of line 22, while being heated to a temperature of from about 100° to about 500° C., to volatize aqueous or oily residue on the spent catalyst particles. Volatized hydrocarbon or water is withdrawn from stripper 20 by means of line 24. Alternatively, the spend catalyst particles can be stripped in reactor 14 to remove hydrocarbons and thereby eliminate the need for stripper 20. In that event the free flowing particles are passed directly to length grading or regeneration hereinafter described (by means not shown).

Free flowing catalyst particles are withdrawn from stripper 20 by means of line 26 and passed by means of line 28 to length grading zone 30.

Figure 4:
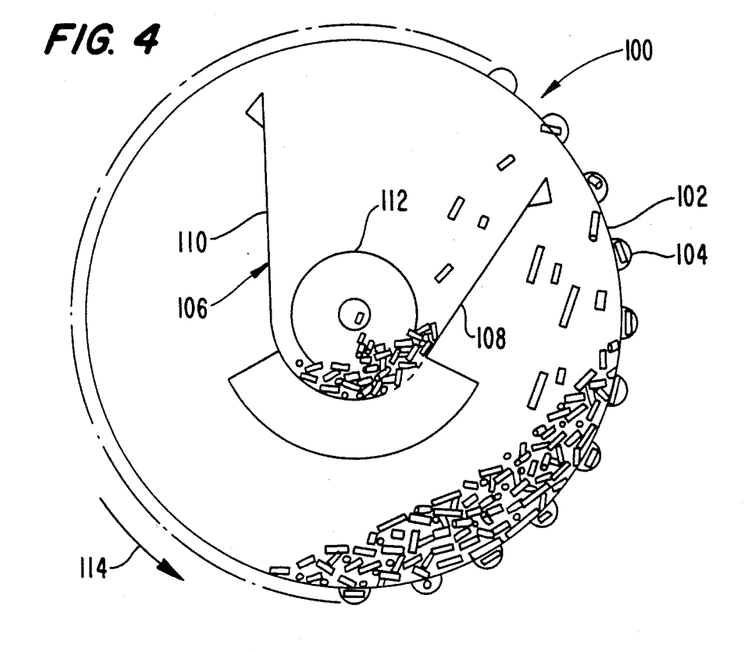
FIG. 4 illustrates the length grading process of the present invention.

Referring now to FIG. 4, the length grading zone of the present invention is shown in more detail.

Figure 5:
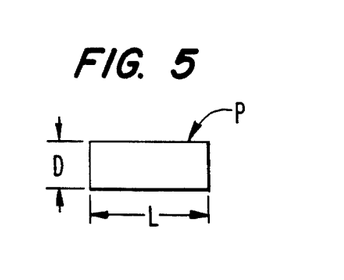
FIG. 5 illustrates a side elevational view of a cylindrical catalyst particle of the present invention.
Figure 6:
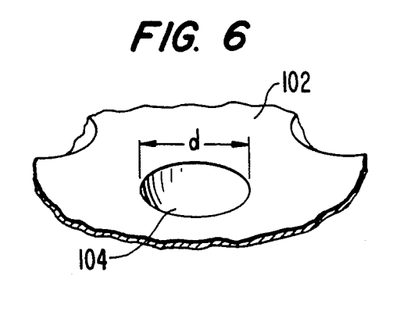
FIG. 6 illustrates a partial perspective view of the length grading system of FIG. 4.

The separation zone comprises length separator apparatus 100 in which particles P (see FIG. 5) are to be separated according to their length, including the separation of two sets of particles, the first set comprising particles of length less than $L_1$ (the cut point) and a second set comprising particles of length greater than $L_1$, such that $L_1$ is greater than the transverse cross-sectional diameter D. The particles in both sets have substantially the same diameter. The particles in the first set comprise particles having an L/D greater than one as well as an L/D less than one. The particles in the second set all have an L/D greater than one. Preferably, the particles in the first set have an L/D greater than one, but less than 2.0. Thus, the preferred particles to be isolated are the longer second set particles having a minimum length such that the L/D of such particles is between 1.0 and 2.0.

Preferably, selectivity of the process is at least 80–90 percent on a single pass through the length grading zone. Selectivity is defined as the percent removal of undesireable particles. In other words, in a given application of the process to a batch of particles, at least 80–90 percent of the particles with a length less than $L_1$ would be separated from the desired particles, which have a length greater than $L_1$, leaving no more than 10–20 percent of the original undersized particles in the desired fraction, e.g., the second set. The apparatus includes a cylindrical wall 102 having a plurality of inwardly opening, outwardly extending identations 104. The cylindrical wall is rotatably mounted in a frame for rotation about its longitudinal axis. The indentations are hemispherical in shape and have a transverse diameter at the inner surface of cylindrical wall 102 equal to the minimal acceptable length, $L_1$, for the catalyst particles. $L_1$ is the range of 0.8 to about 24 millimeters, preferably in the range of from about 0.8 to about 6 millimeters.

A U-shaped trough-like member 106 is fixedly mounted within cylindrical wall 102 such that the cylindrical wall rotates independently of the trough member and about the stationary trough member. Member 106 comprises legs 108 and 110 located at angularly separated positions when viewed in a transverse cross-sectional view of the cylindrical wall. Legs 110 and 108 are oriented in a generally upwardly direction, but may be rotated somewhat to optimize the separation. A spiral or screw conveyer 112 is rotatably mounted within trough member 106. However, the material in trough member 106 may be conveyed by vibrating motion also. This conveyer moves particles placed within the trough along the length of the trough and out a discharge end thereof.

In operation, the catalyst particles to be separated are fed into the interior of cylindrical wall 102 such that they rest on a lower portion thereof. The cylindrical wall is then rotated about its longitudinal axis in the direction indicated by arrow 114. As the cylindrical wall is rotated, the particles having a length L less than the opening diameter d of indentation 104 become lodged within hemispherical indentations 104. These particles are then lifted by a combination of the centrifugal forces applied to these particles, their entrapment within the hemispherical indentations and the rotation of cylindrical wall 102 to a point above the free end of leg 108 of trough member 106. At a point between legs 108 and 110, the position of the indentation no longer retains the particle against the force of gravity and the force of gravity overcomes the centrifugal forces applied by the rotation such that the particles fall from the indentations into trough member 106.

The particles which are too long, i.e., having a length L greater than the diameter d of indentations 104, cannot enter or become entrapped within the indentations. This will cause such particles to slip along the inside surface of cylindrical wall 102, and not be raised above the free end of leg 108. These longer particles remain outside of trough member 106.

In this manner, the set of relatively shorter particles is removed from the set or relatively longer particles placed in cylindrical wall 102, by the shorter set being deposited within trough member 106 and conveyed out of trough 106 by conveyer 112. The longer particles remain at the bottom of cylindrical wall 102. The relatively shorter particles having a length sufficiently small to fit within the indentations remain intermixed with the longer particles within the cylindrical wall until the shorter particles filter down and are entrapped within the indentations. The particles are subjected to rotation within the cylindrical wall for a time period sufficient to remove essentially all of the undesirable shorter particles having a length L less than the diameter d of the hemispherical indentations.

The separation of the particles is not limited by the ratio L/D of the particles. The desired separation or the minimum acceptable length for the particles can be set by choosing the diameter d of the hemispherical indentations 104.

After essentially all of the undesired, too short particles have been removed by being deposited within trough member 106, the remaining particles lying in the bottom of cylindrical wall 102 can be removed from the cylindrical wall for further processing or use. The desired longer particles can be recycled to unit 30 to provide an even greater degree of selectivity and further remove small quantities of undesired, shorter particles. Apparatus which can be adapted for use in the method of the present invention is shown in U.S. Pat. No. 2,119,997, the disclosure of which is hereby incorporated by reference.

Referring again to FIG. 3, length graded catalyst particles having the desired L/D greater than one are withdrawn from length grading zone 30 by means of line 32 and passed by means of lines 33 and 34 to regenerate zone 36 for removal of the carbonaceous deposits from the length graded catalyst particles. Regeneration zone 36 may be a conventional regenerator in which an oxygen-containing gas is supplied by means of line 38 under combustion conditions to oxidize the carbonaceous deposits to carbon dioxide which is withdrawn by line 40. Suitable oxidation temperatures include from about 200° to about 700° C., preferably from about 350° to about 500° C. under atmospheric pressure.

The length graded, regenerated catalyst is withdrawn from regeneration zone 36 by means of line 42 and passed by means of line 44 to join fresh catalyst from line 10 for passage to reactor 14 by means of line 11.

It is desirable to remove volatile hydrocarbons in stripper 20 prior to regeneration in zone 36, since the oxidative regeneration process is exothermic, and the presence of the hydrocarbons during oxidation makes regeneration more difficult to control. Likewise, removal of the volatile hydrocarbons is desirable prior to length grading to avoid agglomeration of the catalyst particles which renders them more difficult to separate.

If the spent catalyst withdrawn from reactor 14 contains a high percentage (25-75 percent) of particles having an L/D greater than one with an undesirably short length, it is preferred to use length grading prior to regeneration to reduce the quantity of particles regenerated and thus reduce the cost of regeneration. However, if the quantity of undesirable particles is relatively small, then the spent catalyst from reactor 14 may be passed by means of lines 18, 46 and 34 directly to regeneration zone 36 or, alternatively if the catalyst is oil wet, the catalyst may be passed from reactor 14 to stripper 20 by lines 18 and 19 and then directly to regeneration 36 by lines 26, 75, 33 and 34, and thereafter passed by means of lines 42, 48 and 28 to length grading zone 30 for length grading. Thereafter, the regenerated, length graded particles may be returned by means of lines 32, 50, 52 and 80 to join line 11 for reintroduction to reactor 14.

If the spent catalyst particles withdrawn from reactor 14 are heavily laden with foreign or tramp metals, such as nickel and vanadium, picked up from the hydrocarbon feedstock, the spent catalyst from line 18 is passed by means of line 19 to stripping zone 20 to be de-oiled, as before, and then passed by means of lines 26, 54 and 55 to extraction zone 56 in which a portion of the undesired metals are selectively acid leached from the catalyst particles. The leaching operation consists of contacting the catalyst particles with an aqueous solution containing 2-20 weight percent sulfuric, sulfonic, nitric, acetic or citric acids at an elevated temperature, preferably 60°-250° F., for a period in excess of five minutes. The acid soaked catalyst pellets are typically rinsed with water before being passed on for further treatment. A process which can be adopted for use in the method of the present inventions is described in U.S. Pat. No. 4,454,240, the disclosure of which is hereby incorporated by reference.

The nickel and vanadium reduced catalyst particles are withdrawn from extraction zone 56 by means of line 58 and passed by line 70, 67 and 34 to regeneration zone 36 for removal of carbonaceous deposits as previously described. The rejuvenated and regenerated catalyst is passed by lines 42, 48 and 28 to length grading zone 30, and then recycled by means of lines 32, 50, 52 and 80 and 11 to reactor 14.

In accordance with a preferred embodiment of the present invention, spent catalyst from reactor 14, which is laden with heavy metals, such as nickel and vanadium, is passed by means of lines 18 and 19 to stripping zone 20, and the resulting free flowing deoiled catalyst particles are then passed by means of lines 26 and 28 to length grading zone 30. Free-flowing particles having the desired length are passed by means of lines 32, 50 and 62 to density grading zone 64 for density grading.

Figure 7:
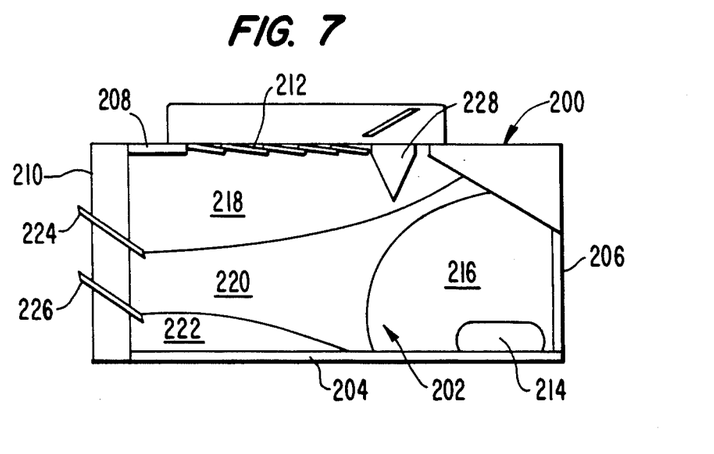
FIG. 7 is top plan view of the density grading apparatus used in the process of the present invention.

A preferred density grading system is shown in FIG. 7.

FIG. 7 is a top plan view of a density separator for density grading catalytic particles. This device is particularly useful for stripped or regenerated 0.7-3.2 millimeter diameter catalyst from a residue conversion process. Some particles are more contaminated with nickel and vanadium than other particles.

Density separator 200 comprises a deck or base 202 surrounded by a plurality of vertically extending walls 204, 206, and 208. Wall 204 forms a banking rail. Wall 208 includes a plurality of cut out gates 212.

Deck 202 is air pervious. Means located below the deck, e.g., fans, direct a stream of air upwardly through the deck. A feed conveyer 214 is provided adjacent one corner of the deck. The deck slopes or is tilted from back to front and from side to side.

Particles to be separated are fed onto deck 202 from above as a stream of air is forced upwardly through the deck and the deck is vibrated. As the particles are fed onto the deck, they are passed into a stratifying zone 216. In the stratifying zone, the deck vibration and the lifting action provided by the air stream combine to cause the particles to stratify into layers according to weight. The heavier layers remain on the bottom on the deck, while the lighter layers rise above the heavier layers.

After stratification of the particles into different weight sets in the stratification zone, the different sets are activated differently by the vibration of the deck. The deck vibration tends to push the heavier layers which are in contact with the deck towards its high side into a heavy particle zone 218. Simultaneously, the lighter particles at the top of the floating particle bed are spaced above the vibrating deck and thus, are not affected by the deck vibration. This causes the lighter particles to float downwardly to the low side of the deck into a lighter particle zone 222. Intermediate weight particles pass into a middle weight particle zone 220.

As the particles are conveyed downwardly along the sloping surface of the deck from the feed conveyor 214, to the discharge end of the deck at wall 210, the deck vibration gradually converts the vertically stratified particle layers into a horizontal separation. Complete separation is achieved at the discharge end of the deck at wall 210 with the heavier particles concentrated at the high side of the deck at adjacent wall 208, light materials at the low side of the deck at adjacent wall 204, and intermediate materials therebetween.

The conversion from vertical stratification to horizontal separation is achieved by vibration. The heavier particles contact the deck and are conveyed to the high side by vibration. The lighter particles being spaced from the deck and not subject to vibration and float downwardly to the low side of the deck under the force of gravity.

The areas 218, 220 and 222 are shown as being distinct in the representation of FIG. 7. In practice, the separation between these three areas will not be so clearly defined.

The discharge end is separated by cutting or stream separation fingers 224 and 226 to separate the different discharges. A trap 228 prevents passage of heavy foreign objects into the separation areas 218, 220 and 222.

Apparatus which can be adapted for use in the method of the present invention is shown in U.S. Pat. No. 2,759,605, the disclosure of which is incorporated by reference.

The apparatus of FIG. 7 can be used to separate mixtures of catalyst-type particles having substantially the same diameter but differing in pellet density, because of metals contamination (as in spent catalysts), or because the mixture comprises dissimilar catalyst particles, such as a mixture of nickel molybdate on alumina with cobalt-molybdate on alumina or a mixture of hydrotreating and hydrocracking catalyst particles.

Referring again to FIG. 3, density grading zone 64 produces a light catalyst fraction, which contains little or no heavy metal contamination, and this light fraction is passed by means of lines 66, 67 and 34 to regeneration zone 36 to remove carbonaceous deposits. The substantially carbon-free, light catalyst fraction can be recycled by means of lines 42, 44 and 11 to reactor 14. Alternatively, if the metals contaminates of the light fraction are two high to allow direct re-use through regeneration, they may be passed through the extraction zone 56 and regeneration zone 36 as described for the medium density fraction below.

A medium density catalyst fraction is withdrawn from density grading zone 64 by means of line 67 and passed by means of lines 68, 60 and 55 to extraction zone 56 for removal of heavy metals. Thereafter the rejuvenated catalyst fraction may be passed by means of lines 58, 70, 67 and 34 to regeneration zone 36 for removal of carbon. The catalyst particles are then returned to reactor 14 by means of lines 42, 44 and 11.

A heavily contaminated fraction is withdrawn from density grading zone 64 by means of line 72, and this fraction can be sent to disposal by means of line 73 or can be passed by means of lines 74, 68, 60 and 55 to acid extraction following the procedure used for the medium density fraction.

It is usually desirable to density grade the catalyst prior to regeneration, since the heavy metal impurities act like a catalyst for the oxidation reaction making control of regeneration temperature difficult. Also, density grading can be influenced by catalyst length often making it desirable to length grade the catalyst prior to density grading.

In accordance with another embodiment of the present invention, spent catalyst from reactor 14 is passed by means of lines 18 and 19 to stripper 20 to provide free flowing particles which are withdrawn by means of line 26 and passed by lines 75, 33 and 34 to regenerator 36. Regenerated particles are withdrawn by means of line 42 and passed by lines 48 and 28 to length grading in unit 30 for removal of the undesired shorter particles which are sent to disposal by means of line 31. The desired, longer particles are passed by means of lines 32, 50 and 62 to density grading in unit 64 to produce three fractions, namely, a light density catalyst fraction, which contains little or no heavy metal contamination, a medium density catalyst fraction, which is lightly contaminated with metal impurities, and a heavily metals-contaminated fraction. The light fraction can be recycled directly to reactor 14 by means of lines 76, 78, 80 and 11 or subjected to extraction in extractor 56 by means of lines 76, 60 and 55. The medium density fraction can be passed by means of lines 67, 68, 60 and 55 to extractor 56, while the heavy fraction can be passed by means of line 72, 74, 68, 60 and 55 to extractor 56, or can be passed to disposal by means of line 73.

The following examples demonstrate the high degree of length and density grading selectivity achievable by the length and density grading techniques of the present invention.

EXAMPLE 1

In order to demonstrate the high degree of selectivity available by the method of the present invention, two experiments were conducted with spent catalyst which had been stripped and a second sample which had been regenerated. The catalyst used in these examples has a diameter of 0.9 millimeter. The catalyst must be oil-free or regenerated before processing because it must be free flowing before subjected to length grading. Each catalyst sample was divided into three fractions on the basis of length using the apparatus depicted in FIG. 4 of the drawings. The results are set forth in Table 1, below:

TABLE 1

| CATALYST | CBD (lbs/ft$^3$) | LOI (wt %) | C (wt %) | S (wt %) | Avg. Length (mm) | % Vol |
|---|---|---|---|---|---|---|
| Stripped Catalyst | | | | | | |
| Feed | 74.9 | 9.6 | 22 | 9.1 | 2.3 | 100 |
| <1.5 mm | 80.5 | 8.4 | 21 | 8.6 | 1.2 | 16 |
| 1.5–3.5 mm | 76.1 | 7.9 | 21 | 8.3 | 2.3 | 71 |
| >3.5 mm | 67.4 | 11.8 | 22 | 7.3 | 3.6 | 13 |
| Regenerated Catalyst | | | | | | |
| Feed | 69.9 | — | 5.9 | 5.8 | 1.6 | 100 |

TABLE 1-continued

| CATALYST | CBD (lbs/ft³) | LOI (wt %) | C (wt %) | S (wt %) | Avg. Length (mm) | % Vol |
|---|---|---|---|---|---|---|
| <1.5 mm | 73.6 | — | 4.5 | 5.2 | 1.3 | 20 |
| 1.5–3.5 mm | 71.1 | — | 6.2 | 5.5 | 1.8 | 74 |
| >3.5 mm | 61.1 | — | 6.2 | 5.1 | 2.8 | 6 |

As seen in Table 1, the stripped catalyst feed material has a density of about 74.9 pounds per cubic foot and an average length of 2.3 millimeters. The tests were conducted to first remove a fraction of catalyst with a length of 1.5 millimeters or shorter; the fraction with a length greater than 1.5 millimeters was then divided into a fraction in the range a 1.5–3.5 millimeters and, a fraction with a length greater than 3.5 millimeters. As seen under the stripped catalyst section at the top of Table 1, three distinct fractions resulted; a short fraction having an average length of 1.2 millimeters, a medium sized fraction of 2.3 millimeters, and a third fraction with an average length of 3.6 millimeters. As seen in the last column of Table 1, the volume distribution achieved was 16% short, 71% medium length, and 13% long. This is a reflection of the amount of catalyst on a fresh basis that is divided into the three fractions.

Similar data was achieved for the regeneration catalyst. The regenerated catalyst has a somewhat shorter average length, (1.6 millimeters vs. 2.3 millimeters) for the feed materials. However, it is seen that there is a distinct difference in the three fractions. The short having an average length of 1.3 millimeters, the medium material has an average length of 1.8 millimeters, and finally, the long material has an average length of 2.8 millimeters. The volume breakdown of the distribution for the three fractions shows that the regenerated catalyst can be cut into three significantly different fractions on the basis of average length.

Figure 8:
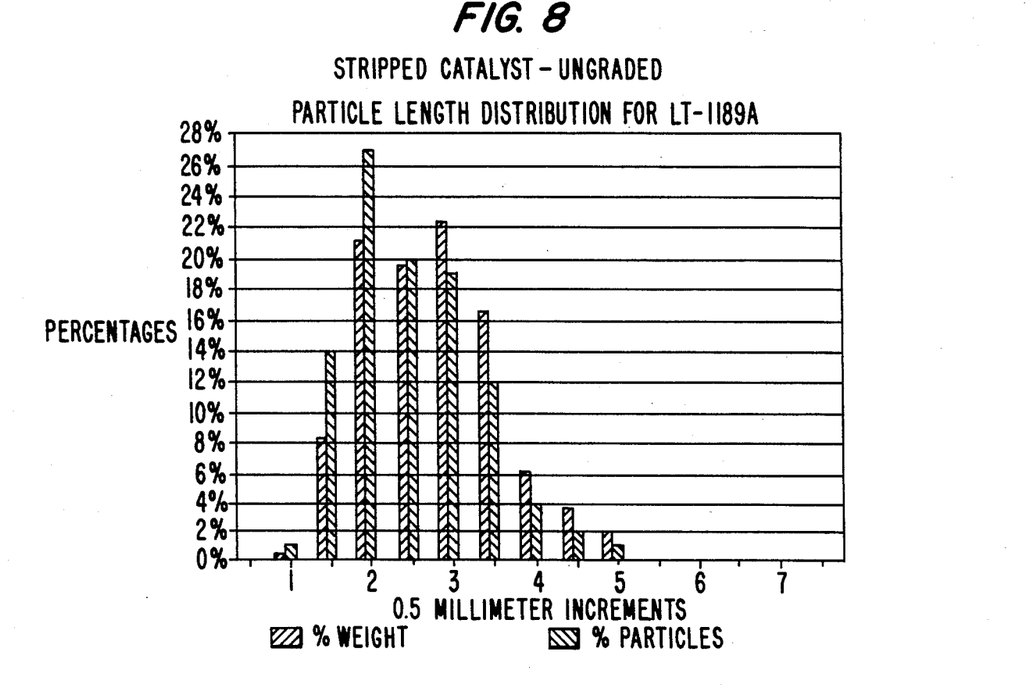
FIGS. 8–18 graphically illustrate the high degree of selectivity achievable with the length grading method of the invention.

FIG. 8 is a graphical representation of the test results in the form of a bar graph. There are two bars at each length increment; one is for weight percent of the particles, and the second is number percent showing a distribution of the ungraded stripped catalyst. As shown there is some material below 1.5 millimeters and a large amount of material above 3.5 millimeters. Using the length grading method of the present invention selective cuts were made at 1.5 millimeters and 3.5 millimeters. The desired short fraction should have 1.5 millimeters and shorter material only, and the long fraction 3.5 millimeters and longer materials only, with a center cut only ranging from 1.5 millimeters to 3.5 millimeters.

Figure 9:
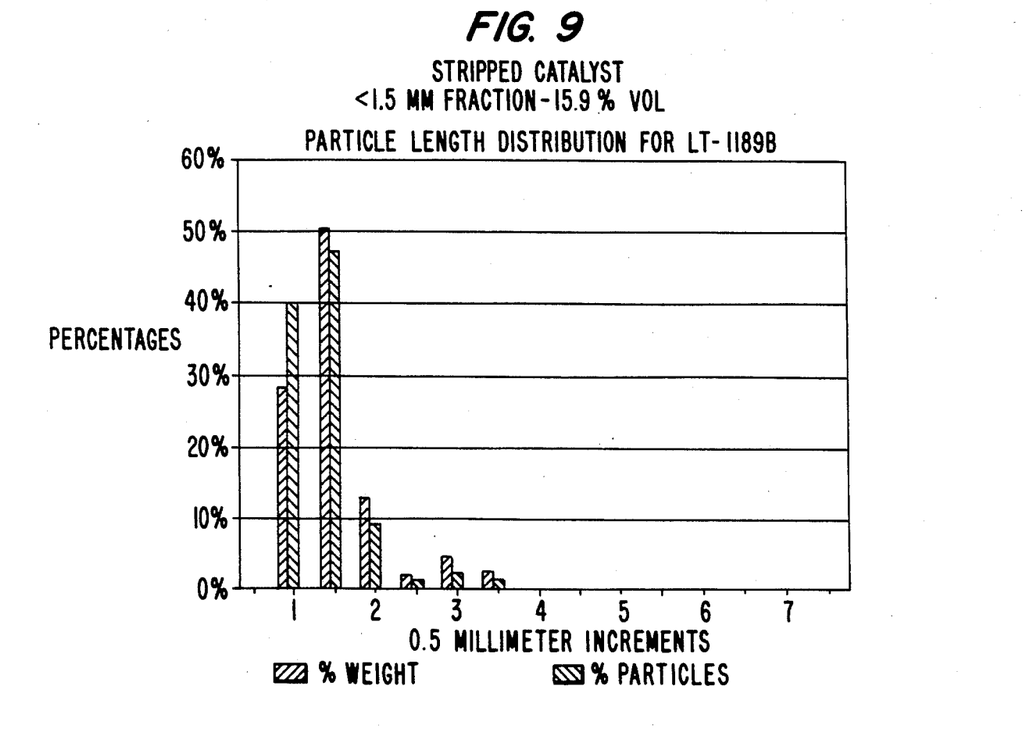

FIG. 9 shows an attempt to isolate short material in a stripped catalyst, i.e., a less than 1.5 millimeters fraction and 15.9% on a volume basis was isolated from the total starting material. As seen in FIG. 9, the preponderance of particles are in the 1.5 millimeters to shorter particle size range. There is approximately 10–15% of materials longer than 1.5 millimeters, and compared to the starting material, this represents a very dramatic improvement. The small materials have been isolated and nearly all of the materials longer than 1.5 millimeters have been eliminated or rejected.

Figure 10:
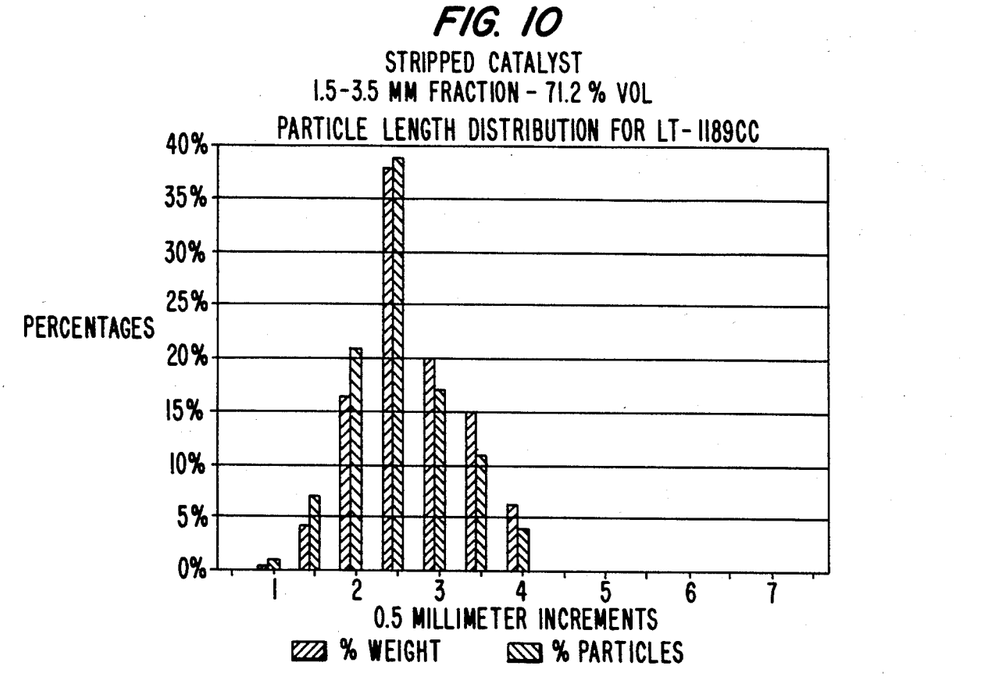

Referring to FIG. 10, it is seen that 71.2% by volume of the middle fraction, 1.5–3.5 millimeters, has been isolated with about 5% of the material that lies outside the range of 1.5–3.5 millimeters. Thus, a very narrow distribution of particles falling 95%+ within the designated particle length range was achieved.

Figure 11:
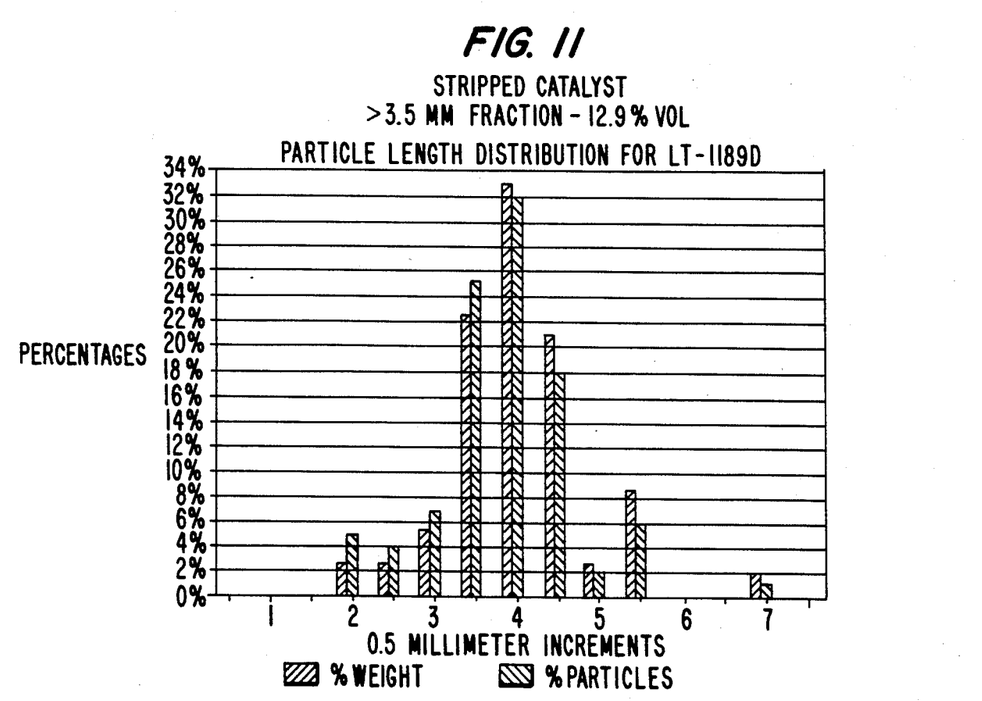

Referring to FIG. 11, it is seen that 12.9% has gone into a long fraction. As seen in FIG. 11, there is probably 10–12% of material shorter than 3.5 millimeters, but the tail or long materials have been isolated from the initial starting material.

Figure 12:
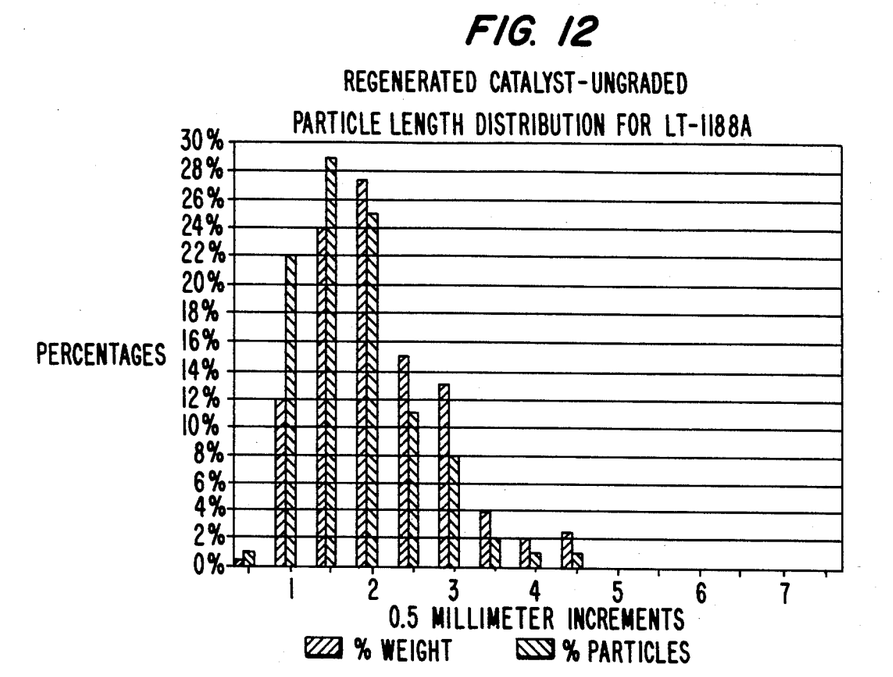

Referring to FIG. 12, the distribution of regenerated catalysts that were to be length graded is shown. By comparison to the stripped material, it is quite a bit shorter, the distribution is biased much more to the short end than was the stripped material. However, the present length grading process is unaffected to a large extent by the distribution.

Figure 13:
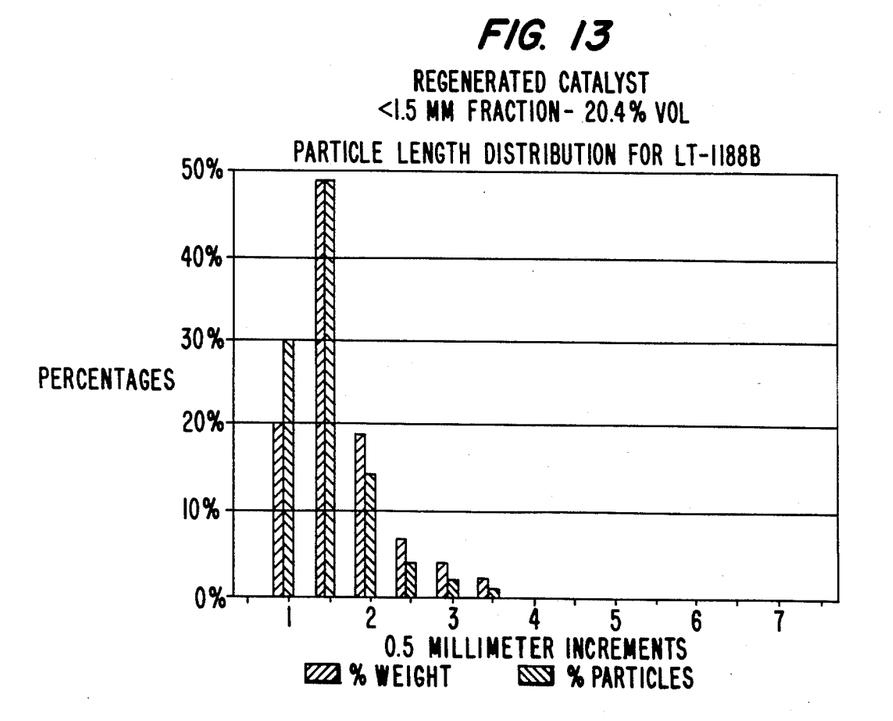

FIG. 13 shows an attempt to remove just the small materials, i.e., 1.5 millimeters and shorter. There is more of a tail than there was with the stripped catalyst because of the biased distribution of the starting material. However, as seen in FIG. 13 approximately 80% of the resulting particles were in the particle length range desired which shows a very high degree of selectivity that could never be approached by conventional screen techniques.

Figure 14:
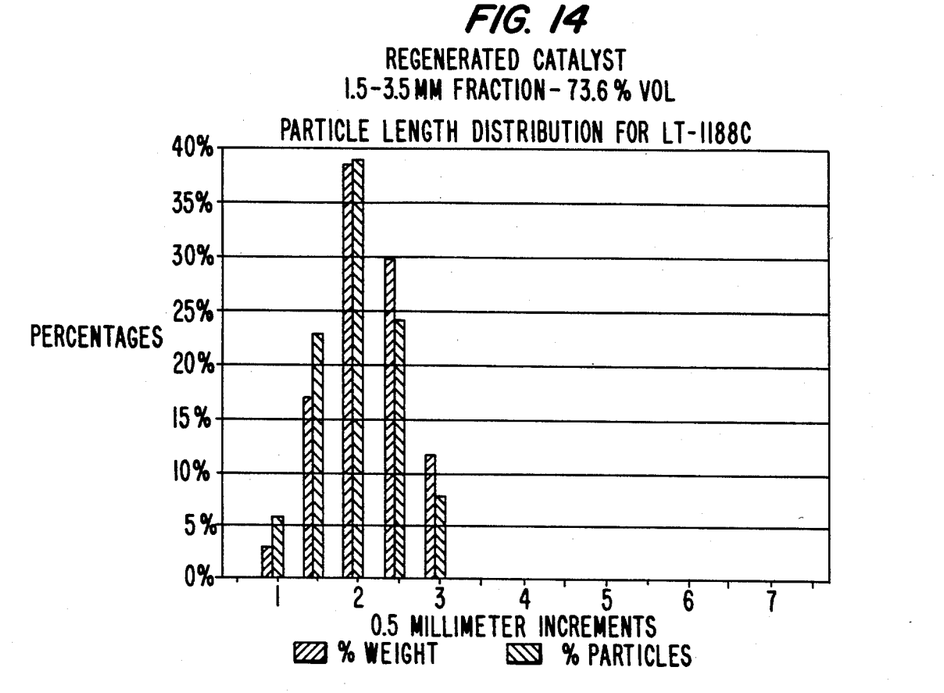

FIG. 14 shows the middle fraction and there is approximately 5%, or about 3% on a weight basis, of materials shorter than 1.5 millimeters and literally nothing longer than the 3.5 millimeters target range.

Figure 15:
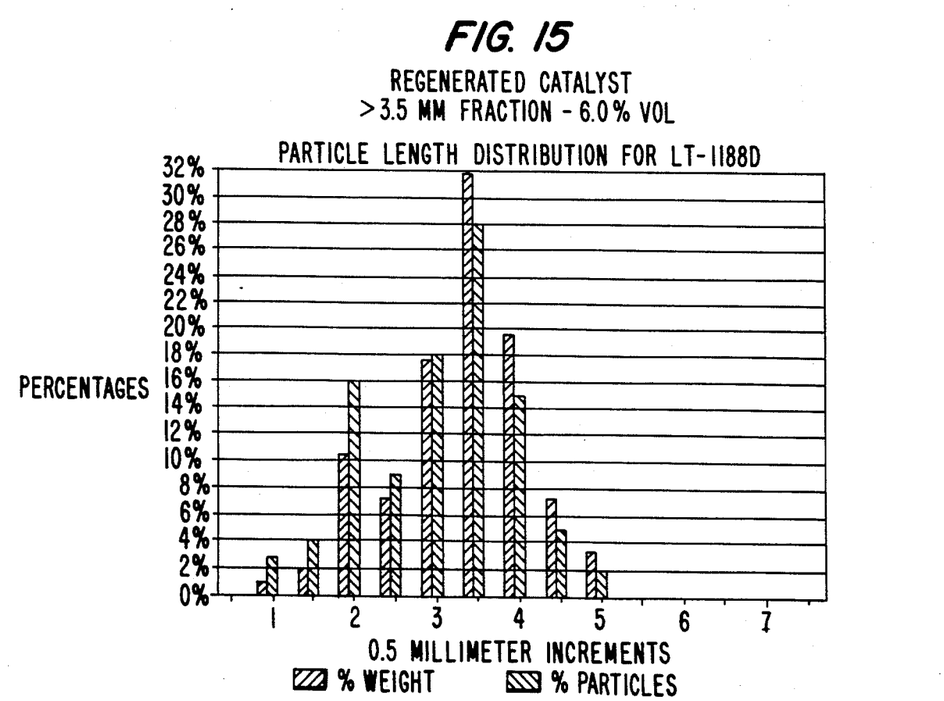

FIG. 15 shows the results of a very difficult separation because only about 7% of the material was being separated. In this case a significant amount of materials shorter than 3.5 millimeters results, but considering the starting distribution, the present process was extremely selective in pulling out just the longer materials with the minimum amount of shorter materials coming with it. In this connection, as seen in FIG. 12, there is only about 4–6% of material in the 3.5 millimeters and above range and that would be an exceedingly difficult cut to isolate considering the small amount of material. But comparing this to FIG. 15 the particle length distribution has been dramatically shifted and the average length has shifted from 1.55 to 2.82.

It is important that the cut points used in these examples represent L/D ratios greater than 1.0. In the first cut the L/D ratio is 1.5/0.9=1.67; and the second cut has an L/D ratio of 3.5/0.9=3.89. Further, it should be understood that a high degree of separation and selectivity has been obtained in a single pass through the length grading equipment. Passing each of the various concentrated fractions (i.e., less than 1.5 millimeters, 1.5–3.5 millimeters, and greater than 3.5 millimeters) back through the length grading apparatus significantly improves the selectivity by further eliminating particles outside the desired particle length range. Such recycle or series operation is used in applications where extremely high selectivity is required.

Figure 16:
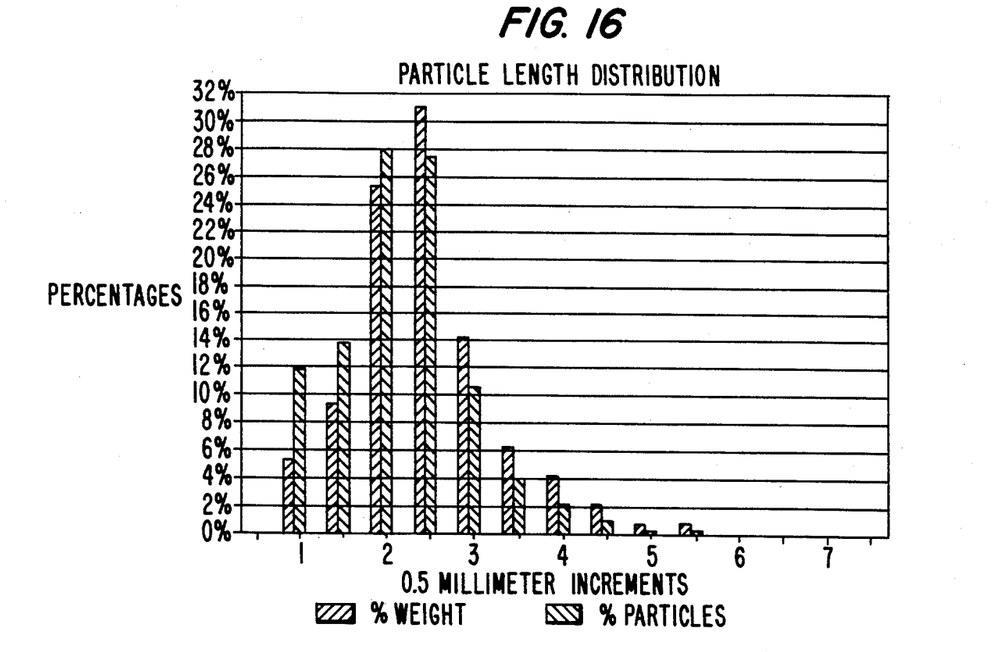

FIG. 16 shows the distribution for a stripped material used in an experiment to make a cut at 2.5 millimeters. As seen from FIG. 16, at about the 2.5 millimeters point, approximately ⅔ of the material should be 2.5 millimeters or shorter, and approximately ⅓ would be 2.5 millimeters or longer, and that is the split which was attempted.

Figure 17:
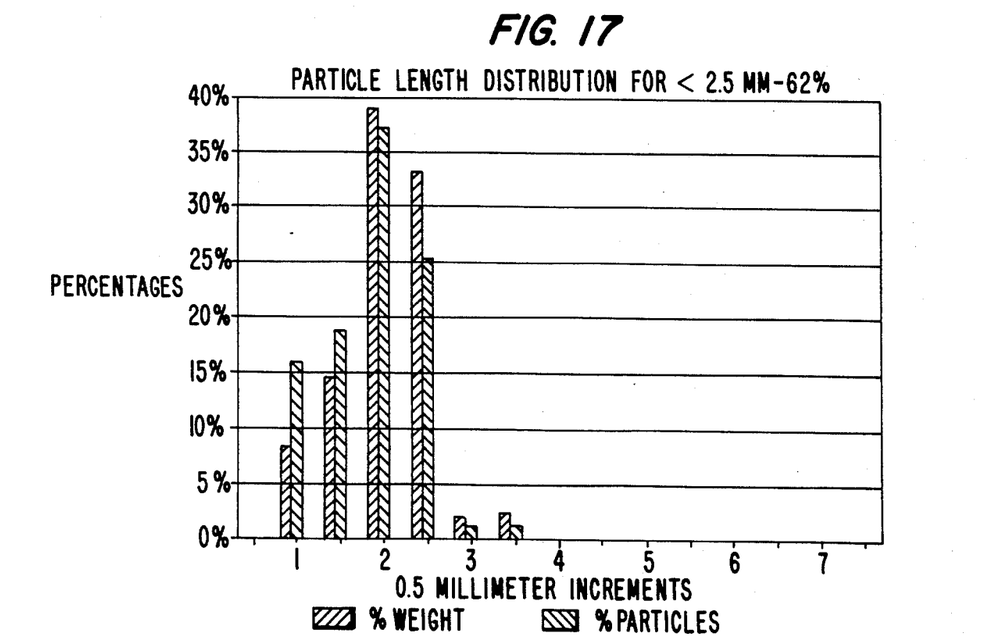

As seen in FIG. 17, the length distribution of the material shorter than 2.5 millimeters is depicted and 62% on a volume basis has been isolated. Surprisingly, less than 5%, i.e., 2–3% of the material is outside the target range of less than 2.5 millimeters.

Figure 18:
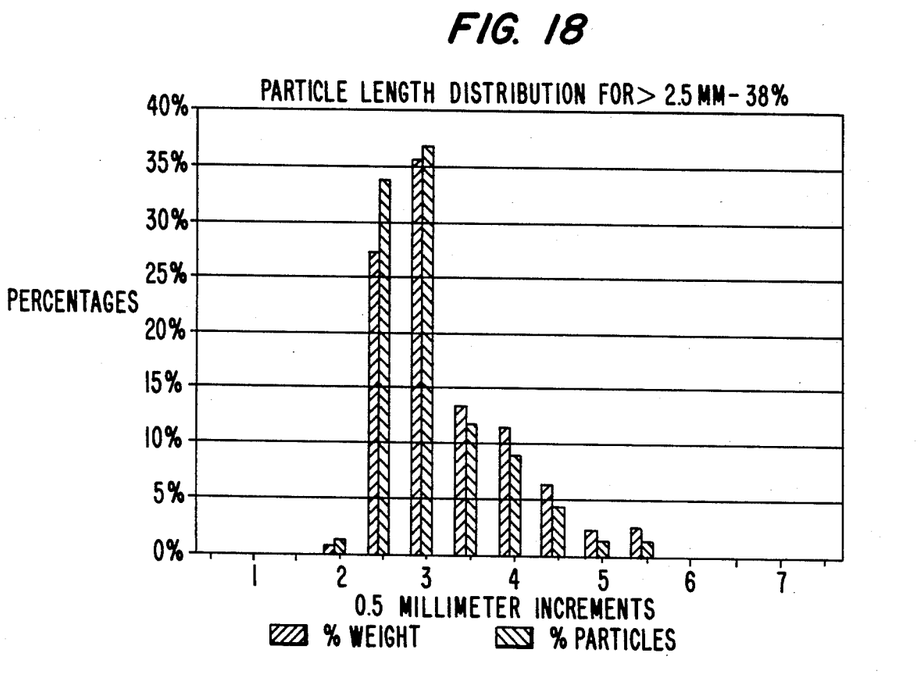

FIG. 18 shows the distribution for particles above 2.5 millimeters and reveals almost no particles shorter than the target range of less than 2.5 millimeters.

EXAMPLE 2

The spent catalyst from Example 1 which has on a fresh catalyst basis a density of approximately 40 lbs. per cubic foot, a surface area of about 200 square meters, and approximately 4% nickel and 8% molybdenum is stripped and length graded to obtain a 1.5-3.5 millimeters length range material. It is advantageous to have particles of similar length in order to render density grading most effective.

Using the apparatus shown in FIG. 7, the stripped material was divided into three fractions, heavy, medium and light comprising 27% heavy, 53% medium and 20% into the light fraction. The results of the density grading are shown in Table 2, below.

TABLE 2

| Catalyst | % Vol | Uncalcined | | | | Calcined | | |
|---|---|---|---|---|---|---|---|---|
| | | CBD (lbs/ft³) | C (wt %) | S (wt %) | SA (wt %) | V (wt %) | Ni (wt %) | Mo (wt %) |
| Fresh | — | 40 | 0 | 0 | 200 | 0 | 4 | 8 |
| Stripped | 100 | 75 | 22 | 9.1 | — | 10.0 | 5.3 | 5.6 |
| Heavy | 27 | 80 | 20 | 10.6 | — | 9.5 | 4.9 | 4.6 |
| Medium | 53 | 76 | 21 | 9.8 | — | 9.6 | 4.9 | 5.1 |
| Light | 20 | 70 | 24 | 6.6 | — | 6.4 | 6.5 | 7.6 |
| Regenerated | 100 | 70 | 5.9 | 5.8 | 68 | 9.8 | 5.4 | 5.7 |
| Heavy | 47 | 77 | 8.6 | 6.5 | 44 | 12.6 | 6.7 | 5.3 |
| Medium | 30 | 71 | 2.9 | 5.4 | 73 | 10.6 | 6.4 | 5.8 |
| Light | 23 | 58 | 1.0 | 4.5 | 152 | 6.6 | 6.2 | 6.9 |
| Heavy | 13 | 68 | 1.3 | 5.1 | 81 | 10.0 | 6.4 | 6.2 |
| Medium | 39 | 62 | 0.8 | 4.9 | 104 | 7.8 | 6.1 | 7.3 |
| Light | 48 | 51 | 0.7 | 3.4 | 189 | 3.6 | 5.6 | 8.8 |

As seen in Table 2, the heavy fraction has a density of 80 lbs. per cubic foot, the medium 76, the light 70. The carbon is fairly homogeneous throughout these samples. The sulfur level follows that of contaminated metals to a large degree, in particular, vanadium, and the change from 10.6 to 9.8 to 6.6% sulphur is a significant change. The light fraction is clearly low on vanadium, demonstrating that 20% of the total starting material has been isolated and has a much lower vanadium level than the composition of the starting material, which has about 10% vanadium on it. There is nickel in the virgin catalyst, as well as nickel laydown as a contaminant on the catalyst. The increasing molybdenum values show that the lighter fractions are less contaminated. As the particles become isolated purer and purer in the separation process, they approach the 8% molybdenum of the fresh catalyst. The heavy fraction is down to 4.6% molybdenum, the medium 5.1%, the light fraction is 7.6% molybdenum almost up to fresh catalyst levels.

Referring to the regenerated catalyst, this is the medium length fraction from the length grading of Example 1. This fraction was divided into three fractions; a heavy, a medium and a light fraction. As seen from the stripped materials in Table 2, the starting catalyst has about 20-22% carbon. The regenerated sample, only has 5.9% carbon. A fully regenerated catalyst would have about 1% or less. Very heavily metal contaminated particles are extremely difficult to regenerate, and when dealing with this heterogeneous mixture of materials is extremely difficult to get down to traditional regeneration levels of 1% carbon. Thus this sample is actually only partially regenerated to 5.9% carbon. The sulphur on the material is 5.8% and the surface area is only 68 square meters, which is dramatically below fresh catalyst level of 200 square meters per gram. The regenerated material has about 9.8% vanadium, 5.4% nickel, and 5.7% molybdenum.

Using the apparatus of FIG. 7, the regenerated material was divided into three fractions: 47% heavy, 30% medium, and 23% light. There is a dramatic difference in the density of the three materials of 77, 71 and 58 pound per cubic foot for the three resulting fractions. The success in this separation is further illustrated by the carbon numbers, since heavily contaminated particles regenerate poorly, and this is supported by the 8.6% carbon level on the heavy fraction material. However, the medium fraction is down to 2.9% carbon and the light fraction is down to 1% carbon, which is a fully regenerated catalyst. The sulphur numbers also go down, proportionally in the direction of lighter fractions and this is a reflection of the vanadium on the catalyst. The surface areas achieved are 44, 73, and 152 square meters per gram for the heavy, medium and light fractions, respectively. Thus the light fraction that was isolated is close to fresh catalyst surface area (152 vs. 200 m²/gm). The amount of vanadium further illustrates success in the separation, i.e., 12.6% vanadium in the heavy fraction, 10.6% in the medium, and down to 6.6% in the light fraction, which is a dramatic and surprising separation.

To further illustrate the benefits of density grading to obtain catalyst fractions with activities suitable for re-use, desulfurization activity tests were measured on the three density graded fractions of regenerated catalyst. Before testing the medium and heavy fractions were first heated at 950° F. to remove the residual carbon. The activities of the regenerated graded samples were compared to those of a fresh sample of catalyst and a sample of regenerated but ungraded spent catalyst. All were used to process a gas oil feedstock in a downflow, fixed-bed test unit at 1.5 LHSV, 700 psig, 625° F. and 1000 SCF/B of treat gas (hydrogen).

TABLE 3

| Catalyst | Product Sulfur (w %) |
|---|---|
| Fresh | 0.42 |
| Light Fraction | 0.46 |
| Medium Fraction | 0.71 |
| Heavy Fraction | 0.74 |
| Regenerated-Ungraded | 0.77 |

Lower product sulfur values are indicative of a more active and more desirable catalyst. As shown in Table 3, the light graded fraction has a desulfurization activity very near that of fresh catalyst and far superior to the medium and heavy fraction. In this example, the light fraction could be beneficially reused in most hydroprocessing applications. The medium and heavy as well as the ungraded regenerated catalysts have activities too low for re-use. They would have to go to disposal or go through a rejuvenation process to be reused. As this example demonstrates, through the use of density grading we are able to isolate a re-usable fraction (light) of catalyst from a mixture (ungraded) which is not re-usable in and of itself.

To further illustrate the process and show the advantages of a staged or recycle operation, the light material, which represents 23% of the total starting material, was density graded into three fractions; a heavy, a medium and a light fraction, as seen in Table 2. The resulting fractions, 13% heavy, 39% medium, and 48% light. The densities show a dramatic difference from one fraction to another, with the light fraction (51 lbs. per cubic foot) approaching virgin material. The carbon numbers are 1.3 weight percent in the heavy fraction, 0.8 weight percent medium, 0.7 weight percent in the light, which indicates more and more highly regenerated catalyst particles in the lighter or purer fractions. Sulphur is down to 3.4 in the light fractions as compared with 4.9 and 5.1 in the heavier fractions. The surface area of the light material is 189 square meters per gram. This is extremely close to virgin catalyst (200 square meters per gram). The vanadium in the heavy fraction is 10%, the medium is 7.8%, and the light is 3.6%, while the molybdenum is 6.2% in the heavy, 7.3% in the medium, and the light fraction at 8.8%, which is equivalent to the molybdenum of virgin catalyst.

What is claimed is:

1. A process for treating a spent hydrotreating catalyst supported on a refractory metal oxide support comprising shaped, generally cylindrical, regular geometric particles having substantially the same diameter, varying length and an L/D greater than one, said spent catalyst particles having carbonaceous and metallic deposits resulting from a hydrocarbon feedstock;

passing said spent catalyst particles to a stripping zone in which volatilizable hydrocarbons are stripped from said withdrawn spent particles to render said catalyst particles free-flowing;

passing said free-flowing catalyst particles to a length grading zone comprising a rotating cylindrical drum having inwardly opening indentations in a cylindrical wall thereof, said indentions having a transverse diameter $L_1$ in the range of 0.8 to about 24 millimeters;

rotating said drum about a longitudinal axis thereof at a speed sufficient to entrap in the indentations and convey catalyst particles having a length below $L_1$ and an L/D greater than one upwardly to a height permitting the catalyst particles to fall into a fixed upwardly opening trough, while retaining catalyst particles having a length above $L_1$ and an L/D greater than one in a bottom portion of said drum; conveying the catalyst particles in the trough out a first outlet;

whereby said catalyst particles with a length less than $L_1$ are separated from the desired catalyst particles which have a length greater than $L_1$; said particles having a length greater than $L_1$ comprising lightly contaminated particles and more heavily contaminated catalyst particles; and passing said catalyst particles from said bottom portion of said drum to a density grading zone in which lightly metals contaminated catalyst particles become suspended in a gas above more heavily metals contaminated catalyst particles, said more heavily contaminated catalyst particles being caused to move upwardly along an inclined, vibrating surface and are thereafter collected at a first density grading zone outlet, said lightly contaminated catalyst particles contacting a lower portion of said vibrating surface and are collected at a second density grading zone outlet; and passing said lightly contaminated catalyst particles to a regeneration zone in which carbonaceous deposits are removed from said lightly contaminated catalyst particles by oxidation in the presence of an oxygen-containing gas to produce regenerated catalyst particles which are lightly contaminated with metals.

2. The process of claim 1 wherein the particles in the bottom portion of the drum have an L/D between 1.0 and 2.0.

3. The process of claim 1 wherein said metallic deposits comprise nickel and vanadium.

4. The process of claim 1 wherein said spent hydrotreating catalyst is nickel molybdate on a refractory metal oxide support.

5. The process of claim 1 wherein $L_1$ is in the range of 0.8 to about 6 millimeters.

6. The process of claim 4 wherein said refractory metal oxide support is alumina.

7. The process of claim 1 wherein lightly contaminated catalyst particles are passed from said second density grading zone outlet to a rejuvenation zone wherein said catalyst particles are acid leached to remove undesired metals from the catalyst particles, and the rejuvenated catalyst particles then passed to said regeneration zone.

8. The process of claim 1 wherein said spent catalyst particles are stripped in said stripping zone with an inert gas at a temperature of from about 100° to about 500° C.

9. The process of claim 1 wherein said lightly contaminated catalyst particles are contacted in said regeneration zone with an oxygen-containing gas at a temperature of from about 200° to about 700° C. to produce regenerated catalyst particles lightly contaminated with metals.

10. The process of claim 1 wherein at least about 80 percent of said catalyst particles with a length less than $L_1$ are separated from the desired catalyst particles which have a length greater than $L_1$.

11. The process of claim 1 wherein said lightly contaminated regenerated catalyst particles are passed to a hydrotreating zone.

* * * * *